US012624669B2

(12) United States Patent
Spyra et al.

(10) Patent No.: US 12,624,669 B2
(45) Date of Patent: May 12, 2026

(54) INTERNAL COMBUSTION ENGINE

(71) Applicant: INNIO Jenbacher GmbH & Co OG, Jenbach (AT)

(72) Inventors: Nikolaus Spyra, Innsbruck (AT); Wolfgang Fimml, Maurach in Tirol (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 182 days.

(21) Appl. No.: 18/556,323

(22) PCT Filed: Apr. 19, 2021

(86) PCT No.: PCT/AT2021/060128
§ 371 (c)(1),
(2) Date: Oct. 19, 2023

(87) PCT Pub. No.: WO2022/221890
PCT Pub. Date: Oct. 27, 2022

(65) Prior Publication Data
US 2024/0191665 A1 Jun. 13, 2024

(51) Int. Cl.
*F02B 19/00* (2006.01)
*F02B 19/10* (2006.01)
(Continued)

(52) U.S. Cl.
CPC ...... *F02D 41/0027* (2013.01); *F02B 19/1028* (2013.01); *F02B 19/12* (2013.01);
(Continued)

(58) Field of Classification Search
CPC ........ F02B 19/00; F02B 19/028; F02B 19/02; F02D 41/0027; F02D 41/0206; F02D 41/0227; F02M 21/0206; F02M 21/0227
(Continued)

(56) References Cited

U.S. PATENT DOCUMENTS

| | | | | |
|---|---|---|---|---|
| 3,455,282 A | | 7/1969 | Pearsall | |
| 4,108,114 A | * | 8/1978 | Kosaka | F02B 43/08 123/3 |

(Continued)

FOREIGN PATENT DOCUMENTS

| | | | |
|---|---|---|---|
| EP | 2378094 | A1 | 10/2011 |
| EP | 2898946 | A1 | 7/2015 |
| EP | 3669059 | A1 | 6/2020 |
| JP | H05332152 | A | 12/1993 |
| WO | 02071451 | A2 | 9/2002 |
| WO | 2019035718 | A1 | 2/2019 |

OTHER PUBLICATIONS

PCT International Search Report and Written Opinion; Application No. PCT/AT2021/060128; dated Dec. 20, 2021; 16 pages.

(Continued)

*Primary Examiner* — Erick R Solis
(74) *Attorney, Agent, or Firm* — Fletcher Yoder, P.C.

(57) ABSTRACT

An internal combustion engine includes an intake manifold, at least one cylinder head with a plurality of piston-cylinder-units, at least one ammonia source, and at least one hydrogen source. Each piston-cylinder-unit includes at least a main combustion chamber, at least one intake valve, a prechamber coupled to the main combustion chamber, and an ignition device in the prechamber. The at least one ammonia source is configured to provide ammonia to each piston-cylinder unit. The at least one hydrogen source is configured to provide hydrogen to each prechamber, wherein the at least one hydrogen source includes at least one reformer for cracking ammonia.

20 Claims, 1 Drawing Sheet

(51) Int. Cl.

| | |
|---|---|
| ***F02B 19/12*** | (2006.01) |
| ***F02B 29/04*** | (2006.01) |
| ***F02B 75/04*** | (2006.01) |
| ***F02D 13/02*** | (2006.01) |
| ***F02D 41/00*** | (2006.01) |
| ***F02D 41/14*** | (2006.01) |
| ***F02M 21/02*** | (2006.01) |
| ***F02P 5/15*** | (2006.01) |

(52) U.S. Cl.
CPC .............. *F02B 29/04* (2013.01); *F02B 75/04* (2013.01); *F02D 13/0215* (2013.01); *F02D 41/0047* (2013.01); *F02D 41/1454* (2013.01); *F02M 21/0206* (2013.01); *F02M 21/0221* (2013.01); *F02M 21/0227* (2013.01); *F02M 21/023* (2013.01); *F02M 21/0287* (2013.01); *F02P 5/1502* (2013.01)

(58) Field of Classification Search
USPC .................................. 123/12, 253–293, 527
See application file for complete search history.

(56) References Cited

U.S. PATENT DOCUMENTS

| | | | | |
|---|---|---|---|---|
| 11,773,777 | B2 * | 10/2023 | Akbari | F23R 3/36<br>60/39.181 |
| 2010/0019506 | A1 | 1/2010 | Gong et al. | |
| 2011/0114069 | A1 | 5/2011 | Grannell et al. | |
| 2011/0259290 | A1 | 10/2011 | Michikawauchi et al. | |
| 2021/0164407 | A1 * | 6/2021 | Heggen | F02B 19/108 |
| 2022/0056856 | A1 * | 2/2022 | Heggen | F02M 21/0215 |
| 2023/0392557 | A1 * | 12/2023 | Bulat | F23R 3/36 |
| 2024/0018897 | A1 * | 1/2024 | Zhou | F02D 19/024 |
| 2024/0247608 | A1 * | 7/2024 | Huang | F02M 21/0209 |

OTHER PUBLICATIONS

Mukherjee Shreya et al., "Low Temperature Ammonia Decomposition Catalysts for Hydrogen Generation", Applied Catalysis B. Environmental, Elsevier, Amsterdam, NL., vol. 226, Dec. 16, 2017 (Dec. 16, 2017), pp. 162-181, XP085636162, https://dx.doi.org/10.1016/j.apcatb.2017.12.039.

* cited by examiner

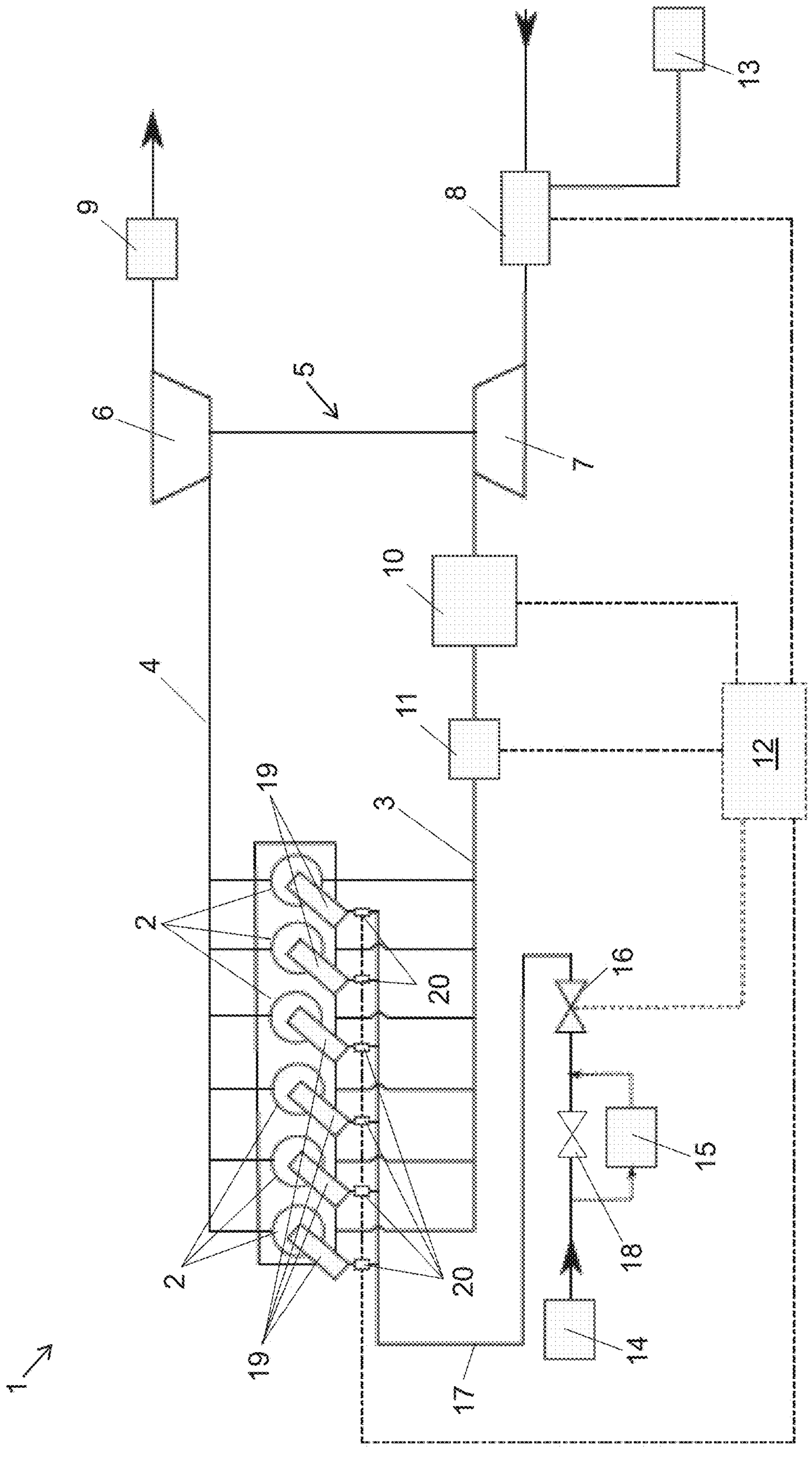
1
2
3
4
5
6
7
8
9
10
11
12
13
14
15
16
17
18
19
20

INTERNAL COMBUSTION ENGINE

CROSS-REFERENCE TO RELATED APPLICATION

This application is a National Stage entry from, and claims benefit of, PCT Application No. PCT/AT2021/060128, filed on Apr. 19, 2021, entitled "INTERNAL COMBUSTION ENGINE", which is herein incorporated by reference in its entirety.

BACKGROUND

The invention concerns an internal combustion engine in which a main fuel for internal combustion is ammonia ($NH_3$). In another aspect, the invention concerns a genset for generation of electric power.

Such internal combustion engines are disclosed in US 2011/0114069 A1, US 2011/0259290A1, EP 2 378 094 A1, US 2010/0019506 A1, and WO 2019/035718 A1.

U.S. Pat. No. 3,455,282 discloses an internal combustion engine having main combustion chambers with a compression ratio between 12 and 16, which are provided with a spark plug to start combustion of a combustion charge consisting of air and ammonia. The addition of small quantities of hydrogen as a combustion promoter is discussed.

Another internal combustion engine where ammonia is used as a fuel is disclosed in EP 3 669 059 A1. Therein, it is described that pilot ignition with a pre-chamber of an air/ammonia mixture in the main combustion chamber of an internal combustion engine is used in both Otto and diesel engines in order to ensure good ignition of the air/ammonia mixture in an internal combustion engine. The pre-chamber has its own air or air/fuel intake, wherein an air/hydrogen mixture or other carbon containing fuels can be used for pilot ignition. It is further described that hydrogen or other carbon containing fuels can be added to the ammonia/air mixture in the main combustion chamber.

BRIEF DESCRIPTION

It is an aspect of the invention, in certain embodiments, to provide an internal combustion engine with an improved operability of burning ammonia as a main fuel.

It is another aspect of the invention, in certain embodiments, to provide a genset for generation of electric power.

These aspects are achieved by an internal combustion engine having the features of the claims and a genset comprising an electric generator coupled to such an internal combustion engine. Embodiments of the invention are defined in the dependent claims.

In an internal combustion engine according to embodiments of the invention, there is provided at least:

- an intake manifold which can provide a gaseous medium (air, or a mixture of air and ammonia in gaseous form, or a mixture of air and ammonia partly in liquid and partly in gaseous form, or one of the aforementioned with a combustion promoter in liquid or gaseous form) to a plurality of piston-cylinder-units,
- at least one cylinder head with a plurality of piston-cylinder-units, each piston cylinder-unit being provided with a prechamber,
- at least one ammonia source for providing ammonia to each piston-cylinder-unit as part of the combustion charge (at least one other part of the combustion charge being air) and to the prechambers, and

- at least one hydrogen source for providing hydrogen to the prechambers via at least one prechamber valve of each piston-cylinder-unit.

Aside from the prechamber each piston-cylinder-unit has at least:

- a (preferably cylindrical) main combustion chamber for combustion of a combustion charge, a volume of the main combustion chamber being defined by the at least one cylinder head and a reciprocally moving piston, the motion of the piston preferably defining a variable volume of the main combustion chamber,
- at least one intake valve coupled to the intake manifold, and
- an ignition device arranged in the prechamber to start combustion of the combustion charge indirectly via flame torches, which enter the main combustion chamber from the prechamber and are created by the ignition of an ignitable air-fuel-mixture inside the prechamber.

The at least one ammonia source can provide ammonia:

- to the main combustion chambers via the intake manifold and the at least one intake valve as part of a mixture of at least air and ammonia, and
- to the prechambers via the at least one prechamber valve provided to the prechamber of each piston-cylinder-unit.

In some embodiments, the engine further comprises a control device to operate the internal combustion engine.

The at least one hydrogen source can comprise at least one hydrogen tank and/or a hydrogen supply line and/or at least one reformer for cracking ammonia.

The use of a reformer as part of the at least one hydrogen source (or as the at least one hydrogen source, if there are no other parts such as a control valve and/or a bypass line) allows on-demand production of hydrogen in an amount adjusted to the need as a combustion promoter in the prechambers. No hydrogen tank for storage of hydrogen is needed. A small reformer can be used.

If on-demand production of hydrogen is to be used at least the following operating parameters should be measured using sensors known in the art:

- engine load, and/or
- temperature of the gaseous medium inside the intake manifold, possibly after a turbocharger, if one is present, and an intercooler, if one is present, and/or
- exhaust gas temperature, and/or
- pressure of the gaseous medium inside the intake manifold, possibly after a turbocharger, if one is present.

Based on measured operating parameters and using, for example a look-up table and/or a model and/or a transfer function, the ratio of hydrogen to ammonia (wherein the hydrogen is to be produced in the reformer and mixed with the ammonia provided to the prechambers) can be determined. A control device can control (open-looped or closed-looped) an actuator, for example a control valve, to provide this amount.

As a general rule:

- the lower an engine load, the higher the ratio of hydrogen to ammonia should be,
- the lower the temperature of the gaseous medium inside the intake manifold, the higher the ratio of hydrogen to ammonia should be,
- the higher the exhaust gas temperature, the higher the ratio of hydrogen to ammonia should be, and
- the lower the pressure of the gaseous medium inside the intake manifold, the higher the ratio of hydrogen to ammonia should be.

The above-said is also valid if hydrogen from a hydrogen tank or a supply line is to be used instead of or together with a reformer as a hydrogen source.

By way of example, the at least one hydrogen source is configured to provide hydrogen to the prechamber of each piston-cylinder-unit in a range of 0 to 10 mass %, preferably of 0 to 5 mass %, in particular 0 to 3 mass % (note that all mass % of hydrogen are given with respect to the total fuel mass brought into a prechamber).

In some embodiments, the control device is configured to at least control a lambda of the combustion charge inside each main combustion chamber to be between 0.9 and 1.2, preferably between 0.98 and 1.02.

In such embodiments, it can be provided that the engine further comprises at least one intercooler coupled to the intake manifold and the control device being further configured to configured to control the intercooler to provide a gaseous medium to the intake manifold with a temperature of at least 40° C., preferably with at least 60° C., and preferably with a temperature below 220° C.

Preferably, the control device is configured to control the ignition device to start combustion of the combustion charge in each piston-cylinder-unit between −35 degrees to −10 degrees before the piston reaches top dead center (TDC).

In some embodiments, the motion of the piston defines a variable volume geometry of the main combustion chamber having a geometrical compression ratio between 10 and 20, preferably 12 and 18, in particular preferably between 14 and 18.

Preferably, an internal combustion engine according to embodiments of the invention can be provided wherein a diameter of each main combustion chamber is at least 130 mm.

In some embodiments, the internal combustion engine comprises an exhaust manifold coupled to the plurality of piston-cylinder-units.

In these embodiments, there can be provided at least one catalytic converter, preferably a three-way-catalytic-converter or a SCR-converter, coupled to the exhaust manifold.

In some embodiments, the internal combustion engine comprises at least one turbocharger to charge the gaseous medium provided to the intake manifold.

In some embodiments, a brake mean effective pressure of the internal combustion engine is higher than 10 bar, preferably higher than 15 bar, in particular higher than 18 bar.

Preferably, at least one valve of the at least one prechamber valve for providing ammonia to the prechamber is a gas valve for providing ammonia in gaseous form, possibly mixed with air, to the prechamber, enriched with hydrogen.

In some embodiments, the control device is configured to provide ammonia to the main combustion chamber in liquid form after opening of the at least one intake valve until 50 degrees crank angle before the piston reaches TDC. This ensures that ammonia is introduced when the pressure in the cylinder is not too high to be negative with respect to the energy balance (such that ammonia does not have to be injected with too high a pressure or too late in the compression stage).

If ammonia in liquid form is used, it should be considered that for combustion the ammonia has to be evaporated which needs additional energy when compared to using gaseous ammonia. To provide the additional energy, it is advantageous to (compared to when gaseous ammonia is used):

- to increase the temperature of the gaseous medium which is to be mixed with the liquid ammonia, and/or
- to design the combustion chambers with a higher geometrical compression ratio to reach a desired temperature for combustion.

In some embodiments, the ammonia source provides or stores ammonia in liquid form and there is provided a heat exchanger to use energy of exhaust gas to evaporate the ammonia into a gaseous form which is then provided to the main combustion chambers.

In some embodiments, the internal combustion engine can be provided with:

- optionally at least one turbocharger followed by
- at least one intercooler
- optionally followed by a throttle valve
- followed by the intake manifold which is coupled to
- the piston-cylinder-units which are coupled to
- the exhaust manifold followed by
- a turbine of the optional at least one turbocharger followed by
- an optional catalytic converter followed by
- an optional heat exchanger.

In some embodiments, the control device is configured to control the intake valves and the exhaust valves of the piston-cylinder-units with overlapping opening times to provide internal EGR (exhaust gas recirculation), preferably with a rate (defined as mass of EGR/(mass of fuel+mass of air+mass of EGR) larger than 0% and below 10%, in particular with a rate larger than 0% and below 5%.

BRIEF DESCRIPTION OF THE DRAWINGS

Embodiments of the invention are discussed with reference to FIG. 1.

FIG. 1 shows an embodiment of an internal combustion engine according to certain aspects of the present technique.

DETAILED DESCRIPTION

FIG. 1 shows an internal combustion engine 1 comprising an intake manifold 3 which can provide a gaseous medium (air, a mixture of air and ammonia in gaseous form, a mixture of air and ammonia partly in liquid and partly in gaseous form, one of the aforementioned with a combustion promoter in liquid or gaseous form) to a plurality of piston-cylinder-units, at least one intercooler 10 coupled to the intake manifold 3 and at least one cylinder head with a plurality of piston-cylinder-units.

Each piston-cylinder-unit has at least a cylindrical main combustion chamber 2 for combustion of a combustion charge, a volume of the main combustion chamber 2 being defined by the at least one cylinder head and a reciprocally moving piston, the motion of the piston defining a variable volume geometry of the main combustion chamber 2 preferably having a geometrical compression ratio between 10 and 20.

Each piston-cylinder-unit is provided with a prechamber 19 in which the ignition device is arranged. The ammonia enriched with hydrogen generated by a reformer 15 is provided to the prechambers 19 via prechamber valves 20 (which can be, by way of example, in the form of injectors).

Furthermore, each piston-cylinder-unit has at least one intake valve coupled to the intake manifold 3 and an ignition device to start combustion of the combustion charge.

The internal combustion engine 1 is provided with at least one ammonia source (two ammonia sources 13, 14 are shown in the FIGURES) for providing ammonia to each piston-cylinder-unit as part of the combustion charge via the intake manifold 3 and the at least one intake valve as part of gaseous medium in form of a mixture of at least air and ammonia.

The internal combustion engine 1 has a control device 12, which is configured to control the intercooler 10 to provide a gaseous medium with a temperature of at least 40° C. to the intake manifold and control a lambda of the combustion charge inside each main combustion chamber 2 to be between 0.9 and 1.2 (in this embodiment by controlling a gas mixer 8 to which one of the ammonia sources 13, 14 is coupled).

The control device 12 is further configured to control a throttle valve 11 and a first control valve 16, which allows addition of ammonia coming from an ammonia source 14 enriched with hydrogen generated by a reformer 15 to the prechambers 19 via an ammonia supply line 17 and the prechamber valves 20.

In the shown embodiment, the hydrogen source comprises not only the reformer but also a bypass line in which a second control valve 18 is arranged and the amount of hydrogen-enriched ammonia provided to the ammonia supply line 17 can be adjustably controlled by the control device 12 via the second control valve 18. If no second control valve 18 is provided, a fixed amount of hydrogen-enriched ammonia can be achieved by suitably choosing a pressure of the ammonia source 14 and/or a diameter of the bypass line and/or the dimension of the reformer 15. It should be noted that the provision of a bypass line is not necessary and the reformer 15 could be the only connection between the ammonia source 14 and the first control valve 16.

Instead of two ammonia sources 13, 14, a single ammonia source 13, 14 to provide ammonia to both the intake manifold 3 and the hydrogen source could be used.

The gaseous medium provided to the intake manifold 3 is charged by a compressor 7 of a turbocharger 5, which is driven by an exhaust turbine 6 of the turbocharger 5 which is arranged in the exhaust manifold 4.

A catalytic converter 9 is also coupled to the exhaust manifold 4.

LIST OF REFERENCE SIGNS

- 1 internal combustion engine
- 2 main combustion chamber
- 3 intake manifold
- 4 exhaust manifold
- 5 turbocharger
- 6. exhaust turbine
- 7 compressor
- 8 gas mixer
- 9 catalytic converter
- 10 intercooler
- 11 throttle valve
- 12 control device
- 13 ammonia source
- 14 ammonia source
- 15 reformer
- 16 first control valve
- 17 ammonia supply line
- 18 second control valve
- 19 prechamber
- 20 prechamber valve
- 21 ammonia source

The invention claimed is:

1. A system, comprising:

an internal combustion engine, comprising:

an intake manifold configured to provide a gaseous medium to a plurality of piston-cylinder-units;

at least one cylinder head with the plurality of piston-cylinder-units, each piston-cylinder-unit of the plurality of piston-cylinder-units having at least:

a main combustion chamber configured to combust a combustion charge, wherein a volume of the main combustion chamber is defined by the at least one cylinder head and a reciprocally moving piston;

at least one intake valve configured to couple the main combustion chamber to the intake manifold;

a prechamber coupled to the main combustion chamber;

an igniter arranged in the prechamber, wherein the igniter is configured to start combustion of the combustion charge indirectly via flame torches which enter the main combustion chamber from the prechamber and are created by an ignition of an ignitable air-fuel-mixture inside the prechamber;

at least one ammonia source configured to provide ammonia to each piston-cylinder-unit of the plurality of piston-cylinder-units:

via the intake manifold and the at least one intake valve as part of gaseous medium in form of a mixture of at least air and ammonia as part of the combustion charge; and via at least one prechamber valve provided to the prechamber;

at least one hydrogen source configured to provide hydrogen to the prechamber via the at least one prechamber valve of each piston-cylinder-unit of the plurality of piston-cylinder-units, wherein the at least one hydrogen source comprises at least one reformer configured to crack ammonia; and a controller configured to at least control an actuator to control a ratio of hydrogen to ammonia of hydrogen-enriched ammonia provided to the prechamber.

2. The system of claim 1, wherein the controller is configured to control the ratio via one or more valves that control a first flow of ammonia through the at least one reformer to generate the hydrogen and a second flow of ammonia through a bypass line around the at least one reformer, and the actuator comprises the one or more valves.

3. The system of claim 1, wherein the controller is configured to at least control a lambda of the combustion charge inside each main combustion chamber to be between 0.9 and 1.2.

4. The system of claim 3, further comprising at least one intercooler coupled to the intake manifold and the controller being further configured to control the intercooler to provide the gaseous medium to the intake manifold with a temperature of at least 40° C. and below 220° C.

5. The system of claim 3, wherein the controller is configured to control the igniter to start combustion of the combustion charge in each piston-cylinder-unit of the plurality of piston-cylinder-units between −35 degrees to −10 degrees before top dead center (TDC).

6. The system of claim 1, wherein the controller is configured to control the at least one reformer to provide on-demand production of the hydrogen in an amount adjusted to a hydrogen demand for the prechamber.

7. The system of claim 6, wherein the at least one hydrogen source excludes a hydrogen storage tank.

8. The system of claim 1, wherein the at least one hydrogen source is configured to provide hydrogen to each prechamber in a range of 0 to 10 mass %.

9. The system of claim 1, wherein each main combustion chamber has a cylindrical cross-section with a diameter of at least 130 mm, the motion of the piston defines a variable volume geometry of the main combustion chamber having a geometrical compression ratio between 10 and 20, and a brake mean effective pressure of the internal combustion engine is higher than 10 bar.

10. The system of claim 1, wherein the controller is configured to control the ratio to increase the ratio with decreases in an engine load, increase the ratio with decreases in temperature of the gaseous medium inside the intake manifold, increase the ratio with increases in temperature of an exhaust gas, and increase the ratio with decreases in pressure of the gaseous medium inside the intake manifold.

11. The system of claim 1, wherein the controller is configured to control the intake valves and exhaust valves of the plurality of piston-cylinder-units with overlapping opening times to provide internal exhaust gas recirculation (EGR) with a rate larger than 0% and below 10%.

12. The system of claim 1, wherein the internal combustion engine comprises at least one turbocharger having a compressor configured to charge the gaseous medium provided to the intake manifold, the at least one ammonia source comprises a first ammonia source fluidly coupled to a mixer upstream from the compressor, and the at least one ammonia source comprises a second ammonia source fluidly coupled to the prechamber and the at least one reformer.

13. The system of claim 1, wherein at least one of the at least one prechamber valve comprises a gas valve configured to provide ammonia in gaseous form to the prechamber.

14. The system of claim 1, wherein the controller is configured to provide ammonia to the main combustion chamber in liquid form, during a period of time from after opening of the at least one intake valve until 50 degrees crank angle before the piston reaches top dead center (TDC).

15. The system of claim 1, wherein the at least one ammonia source stores ammonia in liquid form and there is provided a heat exchanger to use energy of exhaust gas to evaporate the ammonia into a gaseous form which is then provided to the main combustion chambers.

16. A system, comprising:

at least one ammonia source configured to provide ammonia to each piston-cylinder-unit of a plurality of piston-cylinder-units of an internal combustion engine:

via an intake manifold and at least one intake valve as part of a gaseous medium in form of a mixture of at least air and ammonia as part of a combustion charge; and via at least one prechamber valve provided to a prechamber coupled to a main combustion chamber of the internal combustion engine;

at least one hydrogen source configured to provide hydrogen to the prechamber via the at least one prechamber valve of each piston-cylinder-unit of the plurality of piston-cylinder-units, wherein the at least one hydrogen source comprises at least one reformer configured to crack ammonia; and a controller configured to at least control an actuator to control a ratio of hydrogen to ammonia of hydrogen-enriched ammonia provided to the prechamber.

17. The system of claim 16, wherein the controller is configured to control the ratio via one or more valves that control a first flow of ammonia through the at least one reformer to generate the hydrogen and a second flow of ammonia through a bypass line around the at least one reformer, and the actuator comprises the one or more valves.

18. The system of claim 16, further comprising the internal combustion engine.

19. A method, comprising:

supplying, via at least one ammonia source, ammonia to each piston-cylinder-unit of a plurality of piston-cylinder-units of an internal combustion engine:

via an intake manifold and at least one intake valve as part of a gaseous medium in form of a mixture of at least air and ammonia as part of a combustion charge; and via at least one prechamber valve provided to a prechamber coupled to a main combustion chamber of the internal combustion engine;

supplying, via at least one hydrogen source, hydrogen to the prechamber via the at least one prechamber valve of each piston-cylinder-unit of the plurality of piston-cylinder-units, wherein the at least one hydrogen source comprises at least one reformer configured to crack ammonia; and controlling, via a controller, an actuator to control a ratio of hydrogen to ammonia of hydrogen-enriched ammonia provided to the prechamber.

20. The method of claim 19, wherein controlling comprises controlling, via the controller, the ratio via one or more valves that control a first flow of ammonia through the at least one reformer to generate the hydrogen and a second flow of ammonia through a bypass line around the at least one reformer, and the actuator comprises the one or more valves.

* * * * *